United States Patent [19]

Waldrich et al.

[11] Patent Number: 4,614,468
[45] Date of Patent: Sep. 30, 1986

[54] APPARATUS FOR FACILITATING THE ROTATION OF A TOOL-RECEIVING DEVICE

[75] Inventors: Otto Waldrich, Coburg; Rolf Eckstein, Roedental, both of Fed. Rep. of Germany

[73] Assignee: Werkzeugmaschinenfabrik Adolf Waldrich Cobgurg GmbH & Co., Coburg, Fed. Rep. of Germany

[21] Appl. No.: 680,639

[22] Filed: Dec. 12, 1984

[30] Foreign Application Priority Data

Dec. 15, 1983 [DE] Fed. Rep. of Germany ... 8336030[U]

[51] Int. Cl.⁴ .............................................. B23C 1/02
[52] U.S. Cl. .................................... 409/211; 409/215; 409/230; 409/904
[58] Field of Search ............... 409/215, 144, 230, 211, 409/231, 232, 233, 234, 904

[56] References Cited

U.S. PATENT DOCUMENTS

| 3,689,087 | 9/1972 | Flett | 409/64 |
| 3,757,637 | 9/1973 | Eich et al. | 409/230 |
| 3,821,844 | 7/1974 | Harman et al. | 29/568 |
| 4,008,647 | 2/1977 | Hague et al. | 409/230 |
| 4,384,811 | 5/1983 | Eckstein et al. | 409/215 |

FOREIGN PATENT DOCUMENTS 52-45784  4/1977  Japan ................................. 409/233

Primary Examiner—John McQuade
Attorney, Agent, or Firm—Flynn, Thiel, Boutell & Tanis

[57] ABSTRACT

For facilitating the rotating of a tool-receiving device, in particular an angled milling head, an elongated bushing which is concentric with respect to the milling spindle axis is secured in the milling spindle carriage. The bushing has at its free (lower) end a conical receiving opening. A support sleeve is rotatably supported in the bushing by means of radial and axial bearings. The support sleeve has at its free (lower) end a fastening flange for the tool-receiving device. Above the fastening flange is provided a centering cone conforming in shape to and fitting into the conical receiving opening. An oil film is interpositioned between the opening and the centering cone to provide a uniform support for the support sleeve. The milling spindle is supported in the support sleeve. By means of a ring gear, which is driven by a servomotor, it is possible to rotate the tool-receiving device about the axis of the milling spindle into predetermined angular positions. If desired, it can be secured in an adjusted angular position by means of several hydraulically operable clamping elements which act in axial direction of the milling spindle.

10 Claims, 3 Drawing Figures

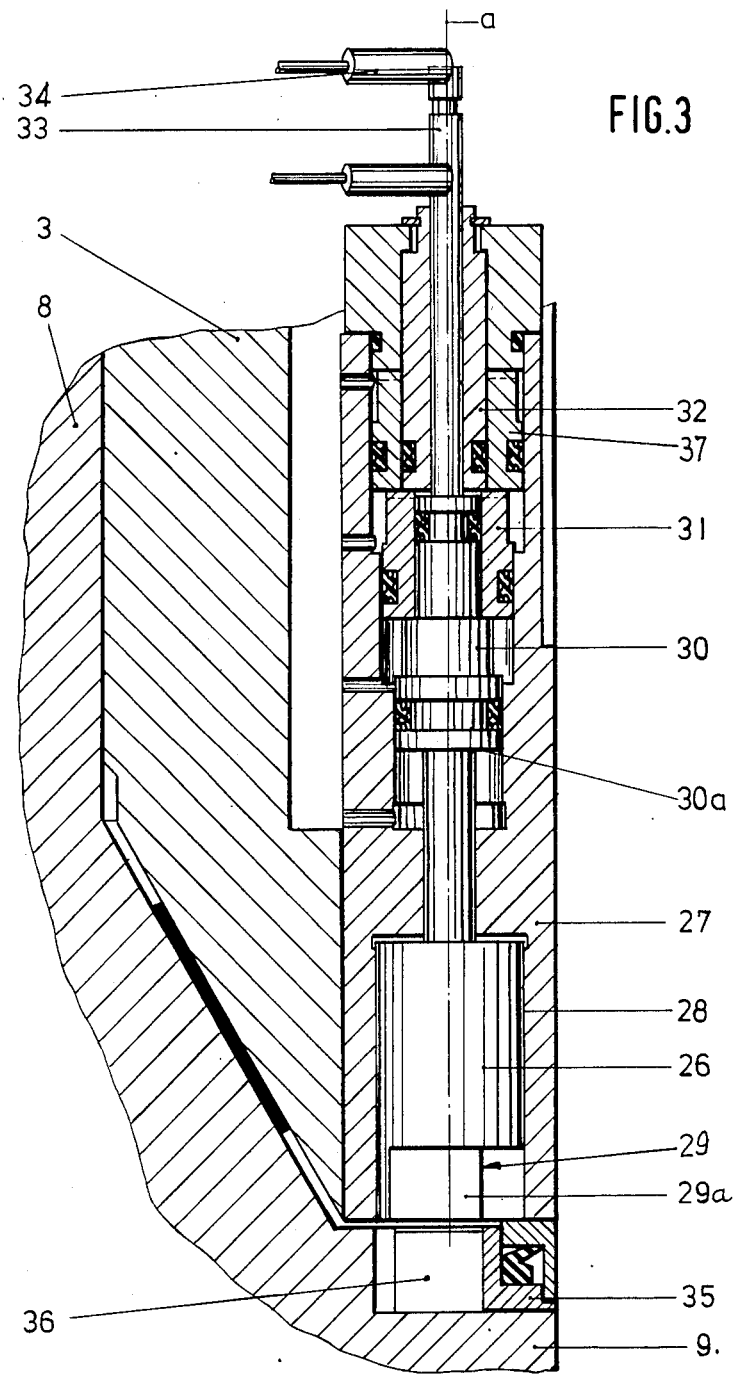

APPARATUS FOR FACILITATING THE ROTATION OF A TOOL-RECEIVING DEVICE

FIELD OF THE INVENTION

The invention relates to an apparatus for facilitating the rotation of a tool-receiving device, in particular an angled milling head, at the free (lower) end of a milling spindle carriage, in which the tool-receiving device is rotatable about the axis of a milling spindle into predetermined angular positions by means of a ring gear or the like being driven by a servomotor, can be centered relative to the milling spindle axis by means of a centering device and can, if desired, be adjusted in the adjusted angular position by means of several hydraulically operable clamping elements, in particular piston-cylinder-units, which act in axial direction of the milling spindle.

BACKGROUND OF THE INVENTION

In a conventional apparatus (German Pat. No. 20 45 604 which corresponds to U.S. Pat. No. 3,757,637) the angled milling head is provided with a centering ring which engages the bottom plate of the milling spindle carriage Four ball-roller elements which are arranged offset at 90° are provided on the bottom plate, on which ball-roller elements is radially supported the centering ring. When the clamping elements are released, the flange of the angled milling head is spaced some distance from the bottom plate of the milling spindle carriage, so that the angled milling head can be rotated about the milling spindle axis by means of a pinion driven by the servomotor and which engages a ring gear which is provided on the centering ring. The angled milling head can in this manner be moved into four basic positions which are offset at 90° through four limit switches which are distributed on the periphery. By means of an indexing device, which consists of indexing surfaces which are arranged on the flange of the angled milling head and by means of stops which cooperate therewith and can be mechanically moved into their path of movement, it is possible for the angled milling head to be adjusted slightly by rotating it about the spindle axis starting out from each of its four basic positions in one or the other direction. The indexing device is provided for the purpose of adjusting the socalled plunge of the milling tool relative to the surface of the workpiece which is to be worked. Since the indexing device is equipped with a total of five different stops, the angled milling head, starting out from each of its four 90° positions, can be rotated in relatively small angle of traverse areas into each of the five different angular positions. After indexing the angled milling head, however, the flange of the angled milling head must be moved by means of the clamping elements absolutely into abutment with the bottom plate of the milling spindle carriage, since the centering ring which is relatively short in axial direction and the ball-roller elements are not suited to transmit larger radial forces or tipping forces from the angled milling head onto the milling spindle carriage. Prior to the start of each further intended rotation of the angled milling head, the clamping elements, however, must again be released, which causes the flange of the angled milling head to be lifted off from the bottom plate. In these operations, which today take place automatically, there exists the danger that dirt particles which exist near the separating line, in particular also chips, are pulled into the separating line. The result is inexactnesses, wear and loss of stiffness or preciseness of coaxial alignment in the plane of the flange connection. Blowing and wiping devices have shown only a small cleaning action, because the dirt accumulates in different consistency and the angled milling head is rotated both to the right and to the left. Because of the small stiffness of the connection between the flange of the angled milling head and the bottom plate, it is not possible to work when the clamping elements are released. This has the disadvantage that the angled milling head, during certain working operations, for example the manufacture of diagonally or circularly extending milling operations, cannot continuously rotate about the milling spindle axis.

Therefore, the basic purpose of the invention is to provide an apparatus for facilitating a rotating of a tool-receiving device, in particular an angled milling head, at the free (lower) end of a milling spindle carriage of the abovementioned type, in which the stiffness or preciseness of coaxial alignment characteristic of the connection between the tool-receiving device and the milling spindle carriage is substantially increased, so that work can be done even with the released clamping elements as well as a regulated rotating of the tool-receiving device into any desired angular position, and in which furthermore the penetration of dirt and problems connected therewith are avoided.

This purpose is attained according to the invention by securing in the milling spindle carriage an elongated bushing which is concentric with respect to the milling spindle axis and which at its free (lower) end has a conical surface defining a receiving opening, by rotatably supporting in the bushing a support sleeve by means of radial and axial bearings, which at the free (lower) end of the support sleeve a fastening flange is provided for the tool-receiving device. Above the fastening flange a centering cone is provided conforming in shape to and being received in the conical receiving opening. The centering cone is supported on the bushing by an interpositioning of an oil film therebetween. The purpose is further attained by the clamping elements being arranged between a bearing sleeve or milling spindle carriage and the support sleeve or parts connected thereto such that in the clamping position of the clamping elements, the centering cone is urged against the conical receiving opening.

Thus, the invention is based on the thought to no longer release the tool-receiving device, in particular the angled milling head, as this had been done so far during each rotating movement of the milling spindle carriage, but to connect it fixedly to a part which is supported in the milling spindle carriage, namely the support sleeve, and to design the support sleeve in such a manner that it is supported as much as possible clearance-free (i.e. no play) and as stable as possible in the milling spindle carriage, so that, if desired, work can be done when the clamping elements are released. The support sleeve is for this purpose supported in an elongated bushing, the axial length of which is great in relationship to its diameter. In order to achieve the desired precise tolerance (i.e. no play) a cone is provided on the support sleeve and through the interpositioning of a thin oil film maintains a uniform abutting relation with the conical receiving opening. This occurs when the clamping elements are released due to the provision of an axial sliding bearing having very precise axial tolerances. Preferably all bearings which are provided between the bushing and the support sleeve, including the bearing between the conical receiving opening and the centering cone are constructed as hydrostatic sliding bearings.

The inventive development substantially increases the stiffness or preciseness in the holding of the coaxial relation of the connection between the tool-receiving device (angled milling head) and the milling spindle carriage. By increasing this stiffness and the practical close tolerance between the support sleeve and the bushing it is possible for certain working operations to rotate the support sleeve with the tool-receiving device secured thereon, for example controlled by a NC-control, into any desired angular position which is required by the working task, for example for diagonal milling. If such a rotating of the angled milling head during the working task is not necessary, then the clamping elements can be moved into the clamping position and through this a better connection between the milling spindle carriage and the tool-receiving device can be created. Due to the possibility of rotating the tool-receiving device during the working task about the milling spindle axis, it is also possible to design the tool-receiving device simpler and more compact. Namely socalled attachment heads exist as a tool-receiving device, which attachment heads were secured in place of an angled milling head up to now on the bottom plate of the milling spindle carriage. The attachment heads were designed such that the tool could be rotated about an axis which is coaxial with respect to the milling spindle axis and additionally yet about a horizontal axis, so that with these two rotational adjusting axes and three further linear adjusting axes of the milling machine, milling operations in three dimensions in the NC-operation were possible. Due to the inventive development of the apparatus, the rotatable support about an axis coaxial with respect to the milling spindle axis in the attachment head can be omitted. Furthermore, it must be emphasized that by avoiding an axial movement between the tool-receiving device and milling spindle carriage during rotation, the collecting of dirt, chips etc. and the problems connected therewith are avoided.

BRIEF DESCRIPTION OF THE DRAWINGS

The invention will be described in greater detail hereinbelow with reference to exemplary embodiments which are illustrated in the drawings, in which:

FIG. 3 is a fragmentary longitudinal cross-sectional view of a third exemplary embodiment.

DETAILED DESCRIPTION

Figure 1:
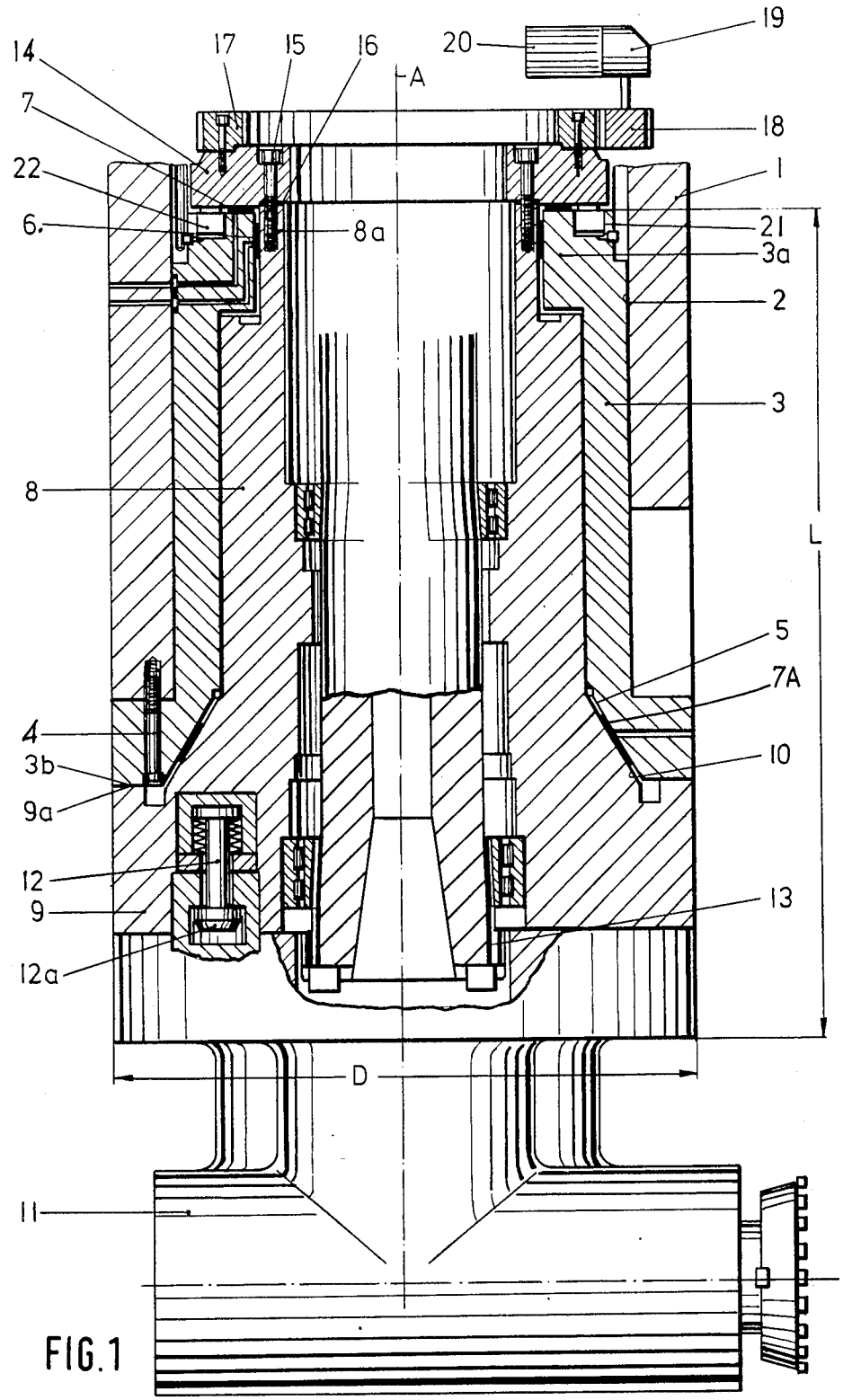
FIG. 1 is a central longitudinal cross-sectional view of a first exemplary embodiment.

The primarily vertically movable milling spindle carriage 1 has a central bore 2 therein into which an elongate bushing 3 is received and secured in place by means of screws 4. The elongate bushing 3 has at its free lower end a surface defining a conical receiving opening 5. Furthermore the bushing 3 is equipped at its upper end with a radial sliding bearing 6 and an axial sliding bearing 7. These two sliding bearings 6 and 7 are preferably constructed as hydrostatic sliding bearings.

A support sleeve 8 is rotatably supported for movement about a spindle axis A by means of the radial bearing 6 and the axial bearing 7 in the bushing 3. The support sleeve 8 has at its free lower end an annular fastening flange 9. In an upward direction above the fastening flange there is provided a centering cone 10 which conforms to the shape of the conical receiving opening 5 and together therewith forms a further hydrostatic sliding bearing 7A. Various tool-receiving devices, as for example the angled milling head 11 which is illustrated in the drawings, an attachment head which is mentioned in the description introduction or an attachment bearing which will be described in greater detail below, can be secured to the annular fastening flange 9. The fastening structure utilized to connect the aforesaid tool-receiving devices to the annular flange in a conventional manner is illustrated in FIG. 1 by hydraulically activated clamping bolts 12 having enlarged heads 12a thereon.

The support sleeve 8 serves furthermore as a support for the milling spindle 13.

A support disk 14 is fixedly connected by means of the screws 15 to the upper end 8a of the support sleeve 8, which end is remote from the angled milling head 11. The support disk 14 forms together with the upper end 3a of the bushing 3 the hydrostatic axial sliding bearing 7. The bearing clearance in the axial sliding bearing 7 is adjusted by inserting between the support disk 14 and the upper end 8a of the support sleeve 8 an adjusting ring 16 of tinfoil having the requisite thickness. When the aforesaid adjustment in the axial, direction occurs, there is to remain between the fastening flange 9 of the support sleeve 8 and the lower front side 3b of the bushing 3 a minimum clearance of approximately 0.01–0.02 mm.

A ring gear 17 is fixedly connected to the support disk 14 for facilitating a rotating of the support sleeve 8 about the axis A. The ring gear 17 engages a pinion 18 driven by a servomotor 20 through a gearing 19. The servomotor 20 can be controlled by a measuring control or a NC-control. To indicate the respective angular positions of the ring gear 17, it is possible to secure a circular scale to the ring gear 17, which is common in NC-controls. Furthermore, it is conceivable to utilize less precise measuring gearings with resolvers on the driving side for effecting the rotary movement about the milling spindle axis A.

Furthermore, several cylindrical bores 21 are provided in the upper end 3a of the bushing 3, into each bore is received a clamping piston 22 adapted to function as a clamping element. The clamping pistons 22 each act onto the support disk 14.

In order to achieve a strong support of the support sleeve 8 in the bushing 3, it is preferable if the axial length L of the support sleeve 8 is at least as great as the diameter D of its fastening flange 9.

As has already been mentioned above, it is important that the centering cone 10 of the hydrostatic bearing 7A be maintained uniformly spaced from the conical receiving opening 5 by the interpositioning of a thin oil film therebetween. In order to further increase the stiffness of the connection between the support sleeve 8 and the bushing 3, it is possible to design the fastening flange 9 in such a manner that its upwardly facing surface 9a rests against the downwardly facing surface 3b of the bushing 3, if under the action of the clamping elements 22 the centering cone 10 is urged against the surface of the receiving opening 5. This simultaneous abutment of the centering cone 10 against the surface of the receiving opening 5 (with interpositioned oil film) and the two surfaces 3b, 9a with each other can be achieved by introducing, during the first-time mounting of the parts, in the region between the surfaces 9a and 3b a hardened plastic mass (casting technique).

OPERATION

The operation of the apparatus which has been described so far is as follows:

Due to the small clearance dimension in the axial direction and also due to the use of a hydrostatic sliding bearing, it is achieved that the centering cone 10, with the interpositioned relatively thin oil film, is held in the receiving opening 5 with a high degree of tolerance in the coaxial relation therebetween. Due to the hydrostatic sliding bearing it is possible to rotate the support sleeve 8 with attached angled milling head 11 into each predetermined angular position which is necessary to perform the working task by means of the servomotor 20 which is controlled by an NC-control during working. The high degree of tolerance (i.e. no play) support of the relatively long support sleeve 8 in the bushing 3 assures a secure connection between both parts. If a swivelling of the angled milling head 11 during the working task is needed, then the angled milling head 11 is moved into the desired angular position by rotating the support sleeve 8 by means of the servomotor 20 and the clamping pistons 22 are then operated and are urged against the support disk 14. This causes the thickness of the thin oil film which normally exists between the centering cone 10 and the receiving opening 5 to be further reduced and upwardly facing surface 9a of the fastening flange 9 to be at the same time also urged against the downwardly facing surface 3b of the bushing 3. This effects an additional support of the fastening flange 9 over a relatively large diameter D to take place. This assures a precise coaxial tolerance characteristic to be maintained in the connection between the milling spindle carriage 1 and the angled milling head 11.

Figure 2:
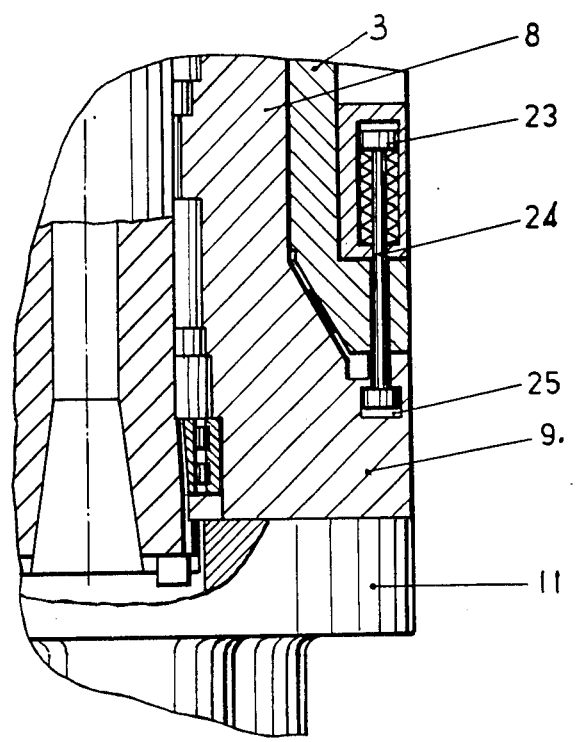
FIG. 2 is a fragmentary longitudinal cross-sectional view of a second exemplary embodiment.

It is possible, as it is illustrated in FIG. 2 of the drawings, to provide at the lower free end of the milling spindle carriage 1 or on the bushing 3 several hydraulically activated clamping pistons 23 each having a clamping bolt 24 thereon. Each clamping bolt 24 has an enlarged head received in an annular groove 25 provided in the fastening flange 9'. These clamping pistons 23 can, if the space conditions permit this, be provided in place of the clamping pistons 22 which are illustrated in FIG. 1. They then fulfill the same function as the clamping pistons 22. However, it is also possible to provide the clamping pistons 23 in addition to the upper clamping pistons 22 in order to bring about, for rough-milling operations, a still better connection of the support sleeve 9' with the milling spindle carriage 1.

The inventive apparatus can not only be used for connecting of angled milling heads or attachment milling heads, but also for socalled attachment bearings, which are used where there are low-lying workpiece portions which have to be worked and the cross section of the milling spindle carriage is too large to permit plung feed operations. These attachment bearings include a pipe-shaped or tubular housing having at its upper end a flange, which up to now was secured to the bottom plate of the milling spindle carriage. A receiving opening for a milling tool therein is provided at the lower end of the tubular housing. The milling tool is arranged coaxially with respect to the milling spindle. So far the housings of such attachment bearings have had a circular cross section. If one uses the inventive apparatus, then one can secure the attachment bearing on the fastening flange 9 of the support sleeve 8. Since the support sleeve 8 can be rotated at any time into any desired angular position, it is now possible to construct the housing of the attachment bearing eccentrically and to substantially reinforce same at the side which is remote from the point of engagement of the milling tool.

A further advantage of the inventive apparatus results when a hydrostatic bearing is used. Namely oil under pressure must constantly be supplied to the hydrostatic sliding bearings, since oil constantly discharges through the bearing gap. The discharging oil absorbs the heat of the milling spindle bearing and thus functions as a constant heat discharge device.

To achieve a particularly precise indexing tolerance in the 90° positions, it is also possible to provide an indexing apparatus, similar to the one shown in U.S. Pat. No. 4,384,811. At least one housing 27 (FIG. 3) with a slide member 26 movably supported therein is for this purpose secured to the free lower end of the bushing 3 or the milling spindle carriage. However, four similar housings 27 with slide members 26 are arranged therein are provided, each housing 27 being offset to one another at 90° in the peripheral direction. Each of the slide members 26 can be moved along guideways 28 which are inclined slightly relative to the milling spindle axis A in the peripheral direction. The slide member 26 is preferably constructed cylindrically and the guideway 28 is formed by a bore in the housing 27, the axis a of which is inclined relative to the milling spindle axis at a small angle in peripheral direction. The inclination is such that the axis a, according to FIG. 3, extends slightly inclined with respect to the drawing plane when the milling spindle axis A lies in the drawing plane. The inclination can for example be 1:100, so that the angle of inclination of the axis a is approximately 35 minutes with respect to the plane of the drawing for FIG. 3. In a modification of the embodiment which is disclosed in U.S. Pat. No. 4,384,811 the slide member 26 has at the lower free end a keywedge-shaped shoulder 29, the two bearing surfaces 29a of which, which are oriented both approximately radially with respect to the milling spindle axis A and extend parallel with respect to the milling spindle axis.

Four key pieces 35, which are offset 90° to one another in peripheral direction, are arranged very precisely in their 90° angular position in the fastening flange 9 of the support sleeve 8 and are fixedly connected to the fastening flange 9. Each key piece 35 has a groove 36 therein which extends radially with respect to the milling spindle axis and into which groove 36 fits the shoulder 29. When the support sleeve 9 is rotated by the NC-control into one of its basic coordinate positions, the shoulder 29, by moving the slide member 26 downwardly, can be moved into one of the grooves 36. An adjusting of the slide member 26 in axial direction occurs through a selective loading of the pistons 30, 31, 37. Depending on which piston is being loaded, the slide member 26 can assume three different, precisely defined elevational positions. The shoulder 29 is thereby moved far into the groove 36. If the axis a is inclined at an angle of 35 minutes relative to the drawing plane, then an elevational adjustment of the slide member 26 along a specified adjusting path and distance in the axial direction effects an adjustment of the fastening flange 9 in the peripheral direction by an amount which is exactly one hundred times smaller. In order for the shoulder 29 to completely exit from the groove 36 and for the support sleeve 8 to be able to rotate in an unrestricted manner relative to the bushing 3, only the lower annular surface 30a of the piston 30 is loaded with pressure. The piston 30 moves then upwardly until the piston 31 engages the lower end of the guide sleeve 32. The proximity switch 34 is operated by the piston rod 33, which switch then provides the signal rendering the "support sleeve 8 free for rotation". The cylinder chambers of the four housings 27 which are offset at 90° to one another, which cylinder chambers are associated with the pistons 30, 31, 37, are coupled with one another through not illustrated hydraulic lines in such a manner that in all four housings 27 the pistons are simultaneously loaded.

The embodiments of the invention in which an exclusive property or privilege is claimed are defined as follows:

1. In an apparatus for facilitating a rotation of a tool-receiving device oriented at the free end of a milling spindle carriage, said tool-receiving device being rotatable by means of ring gear means driven by a servomotor about an axis of a milling spindle into predetermined angular positions, said tool-receiving device further being centerable by means of a centering mechanism relative to said milling spindle axis and still further being fixable in the adjusted angular position by means of several hydraulically operable clamping elements which act in axial direction of said milling spindle, the improvement comprising wherein in said milling spindle carriage there is secured an elongated bushing which is concentric with respect to said milling spindle axis, said bushing having at its free end means defining a conical receiving opening, wherein a support sleeve is rotatably supported in said bushing by means of radial and axial bearings, said support sleeve having at its free end a fastening flange for said tool-receiving device, said support sleeve also having above said fastening flange a centering cone conforming in shape to said receiving opening and being received in said receiving opening, wherein a further bearing is provided and interpositioned between said centering cone and said receiving opening for effecting a uniform spacing therebetween, wherein said milling spindle is supported in said support sleeve, and wherein said clamping elements include means for effecting an urging of said bushing and said support sleeve toward each other so that said centering cone is urged against said conical receiving opening.

2. The apparatus according to claim 1, wherein said radial and axial bearings and said further bearing between said conical receiving opening and said centering cone are hydrostatic sliding bearings.

3. The apparatus according to claim 1, wherein a support disk is supported on an upper end of said bushing and is connected to an upper end of said support sleeve, said upper end being remote from said tool-receiving device.

4. The apparatus according to claim 3, wherein in said upper end of said bushing there are provided several axially parallel cylinder bores, in each of which is arranged a clamping piston which is engageable with said support disk.

5. The apparatus according to claim 3, wherein said ring gear means includes a ring gear connected to said support disk, said ring gear engaging a pinion driven by said servomotor.

6. The apparatus according to claim 1, wherein the axial length of said support sleeve is at least as great as the diameter of said fastening flange.

7. The apparatus according to claim 1, wherein during an urging of said centering cone surface against said conical receiving opening under the action of said clamping elements, a surface of said fastening flange engages an opposing surface of said bushing.

8. The apparatus according to claim 1, wherein said included means on said clamping elements are axially acting, hydraulic clamping pistons arranged at the free end of said bushing, said clamping pistons each having a clamping bolt received in an annular groove provided in said fastening flange.

9. The apparatus according to claim 1, wherein plural guideways are provided at the free end of said bushing, said guideways being slightly inclined in a peripheral direction relative to said milling spindle axis, and wherein a slide member is movably supported in each of said guideways and has at its free end a keywedge-shaped shoulder with two approximately radially oriented bearing surfaces which extend parallel with respect to said milling spindle axis and extend selectively into each one of four correspondingly constructed grooves which are provided on said fastening flange, extend radially with respect to said milling spindle axis and are offset each at 90° from each other.

10. The apparatus according to claim 9, wherein four guideways are offset at 90° to one another, each with a said slide member arranged therein, each said slide member being simultaneously received in one of said four grooves, whereby for the simultaneous adjustment of all four slide members along equally large adjusting paths a hydraulic adjusting device engages each slide member, said four adjusting devices being coupled with one another.

* * * * *